US010009510B2

(12) United States Patent
Tzeng et al.

(10) Patent No.: US 10,009,510 B2
(45) Date of Patent: Jun. 26, 2018

(54) SCANNER WITH A BACKGROUND (71) Applicant: Hewlett-Packard Development Company, L.P., Houston, TX (US)

(72) Inventors: Di-Yuan Tzeng, Boise, ID (US); Dennis J Schissler, San Diego, CA (US); Craig T Johnson, San Diego, CA (US); Patrick J Chase, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/308,093

(22) PCT Filed: Apr. 29, 2014

(86) PCT No.: PCT/US2014/035789
§ 371 (c)(1),
(2) Date: Oct. 31, 2016

(87) PCT Pub. No.: WO2015/167446
PCT Pub. Date: Nov. 5, 2015

(65) Prior Publication Data
US 2017/0064143 A1  Mar. 2, 2017

(51) Int. Cl.
*H04N 1/387* (2006.01)
*H04N 1/407* (2006.01)
(Continued)

(52) U.S. Cl.
CPC ......... *H04N 1/4078* (2013.01); *H04N 1/0032* (2013.01); *H04N 1/0405* (2013.01);
(Continued)

(58) Field of Classification Search
CPC .............. H04N 1/4078; H04N 1/3878; H04N 2201/0422; H04N 1/0032; H04N 1/0405; H04N 1/12; H04N 2201/0094
See application file for complete search history.

(56) References Cited

U.S. PATENT DOCUMENTS 5,017,963 A * 5/1991 Tuhro ................. G03G 15/047
355/75
5,940,544 A   8/1999 Nako
(Continued)

FOREIGN PATENT DOCUMENTS

JP   H04-032358   2/1992
JP   H07-115514   5/1995
(Continued)

OTHER PUBLICATIONS

International Searching Authority. ISA/KR. International Search Report, dated Mar. 9, 2016. Application No. PCT/US2014/035789. Filing date Apr. 29, 2014.
(Continued)

*Primary Examiner* — Christopher D Wait
(74) *Attorney, Agent, or Firm* — HP Inc. Patent Department (57) ABSTRACT

A scanner is disclosed. The scanner has a background pattern that is captured as part of the scanned image. The scanner may be a flatbed scanner, a sheet-feed scanner, or a flatbed scanner using an automatic document feeder (ADF).

14 Claims, 9 Drawing Sheets

(51) Int. Cl.
  *H04N 1/04* (2006.01)
  *H04N 1/00* (2006.01)
  *H04N 1/12* (2006.01)
(52) U.S. Cl.
  CPC ............. *H04N 1/12* (2013.01); *H04N 1/3878*
    (2013.01); *H04N 2201/0094* (2013.01); *H04N*
    *2201/0422* (2013.01)

(56) References Cited

U.S. PATENT DOCUMENTS

| | | |
|---|---|---|
| 7,151,859 B2 | 12/2006 | Yamaai |
| 2008/0316549 A1* | 12/2008 | Bush, III ............ H04N 1/00681 358/488 |
| 2011/0194725 A1 | 8/2011 | Das Gupta et al. |
| 2012/0106844 A1 | 5/2012 | Ramachandrula et al. |
| 2014/0118796 A1* | 5/2014 | Isaev ...................... H04N 1/047 358/451 |

FOREIGN PATENT DOCUMENTS

| | | |
|---|---|---|
| JP | H10-200703 | 7/1998 |
| JP | 2002027204 | 1/2002 |
| JP | 3259966 | 2/2002 |
| JP | 2005-065128 | 3/2005 |
| JP | 2006016201 | 1/2006 |
| JP | 2006094239 | 4/2006 |
| KR | 20040055686 | 6/2004 |

OTHER PUBLICATIONS

Banerjee, S. et al., Real-time Embedded Skew Detection and Frame Removal, HP Labs~Bangalore (Research Paper), Feb. 9, 2010, 4 Pages.

Mascaro et al., Estimating the Skew Angle of Scanned Document Through Background Area Information, Federal University of Pernambuco~Jul. 18, 2008, 8 Pages.

* cited by examiner

SCANNER WITH A BACKGROUND

BACKGROUND

Flatbed scanners are scanners that have a transparent scan platen and a movable scan head. The object to be scanned is placed against the platen. During the scan the scan head navels down the length of the platen while capturing an image of the object on the platen. Sheet-feed scanners have a stationary scan head. The object to be scanned is moved past the scan head during a scan while the scan head captures an image of the object. The object to be scanned is typically moved past the stationary scan head with an automatic document feeder (ADF).

Many flatbed scanners also have an ADF for scanning multiple page documents. When using the ADF for a scan, the scan head is moved to an ADF scan location and then remains at place while the ADF moves objects past the scan head.

Some scanners are stand-alone scanners. Other scanners are integrated with a printer into a multi-functional peripheral (MFP). MFP's may also be called multi-functional devices (MFD), all-in-ones (AiO) or the like.

DETAILED DESCRIPTION

When scanning an object with a scanner, the object may not be aligned to the scan head during the scan. When the object is not aligned, the image of the object may be rotated or skewed in the scanned image. When scanning with a flatbed scanner the miss-alignment may be caused by having the object miss-aligned on the scan platen. In some cases the scan head may not be perfectly aligned to the scan platen, so even when the object is properly aligned to the scan platen the image of the object will still be skewed.

When scanning using an ADF, the object may be rotated or skewed as the ADF feeds the object past the scan head. This may be caused by uneven pressure in the feed rollers in the ADF or uneven friction between the object and the feeding mechanism in the ADF.

When the image of the object is skewed the scanner firmware or scanner software may try to correct the image by de-skewing the object in the scanned image. Scanner firmware is typically known as the computer instructions that are executed by the processors inside the scanner. Seamier software is typically known as the computer instructions that are executed by the processors inside a computer connected to the scanner.

One way to connect a skewed object in a scanned image is to use the locations of the edges of the object that is skewed. Finding the edges of an object in a scanned image may be difficult. Most scanners have a white background above the scanning area. For flatbed scanners the white background is attached to the underside of the lid of the scanner. For ADF scanners a white background strip is typically located opposite the fixed location of the scan head. In either case the white background is imaged for any locations not covered by the object being scanned. Most objects that are scanned are printed on white media. The white media blends in with the white background in the scanned image, making it difficult to accurately locate the edges of the objects that were scanned.

Some scanners have a black background that can be switched with the white background. The black background makes it easier to locate edges of white objects. But the black background does not help to locate dark or black objects. The black background also creates other problems, for example creating black areas in the scanned image where holes are punched in the object or where a corner of the object is bent. In addition the black background may change the brightness or color of the scanned object. This problem is made worse when scanning thin or lightweight media.

In one example a. Spanner will use a background with a repeating pattern of darker tones and lighter tones. In some examples the pattern will be a repeating array of vertical bars. The width of the bars or the spacing between bars may be dependent on the scanner resolution and/or the modulation transfer function (MTF) of the scanner. In some examples the pattern will have a frequency of 50 cycles/trick hi one example the darker tone will be a light tone and the lighter tone will be white. For example the darker tone will have a brightness equal to $L^*=88$ and the lighter tone will have a brightness equal to $L^*96$ with a tolerance of +/−1 to 3 $L^*$s.

Figure 1:
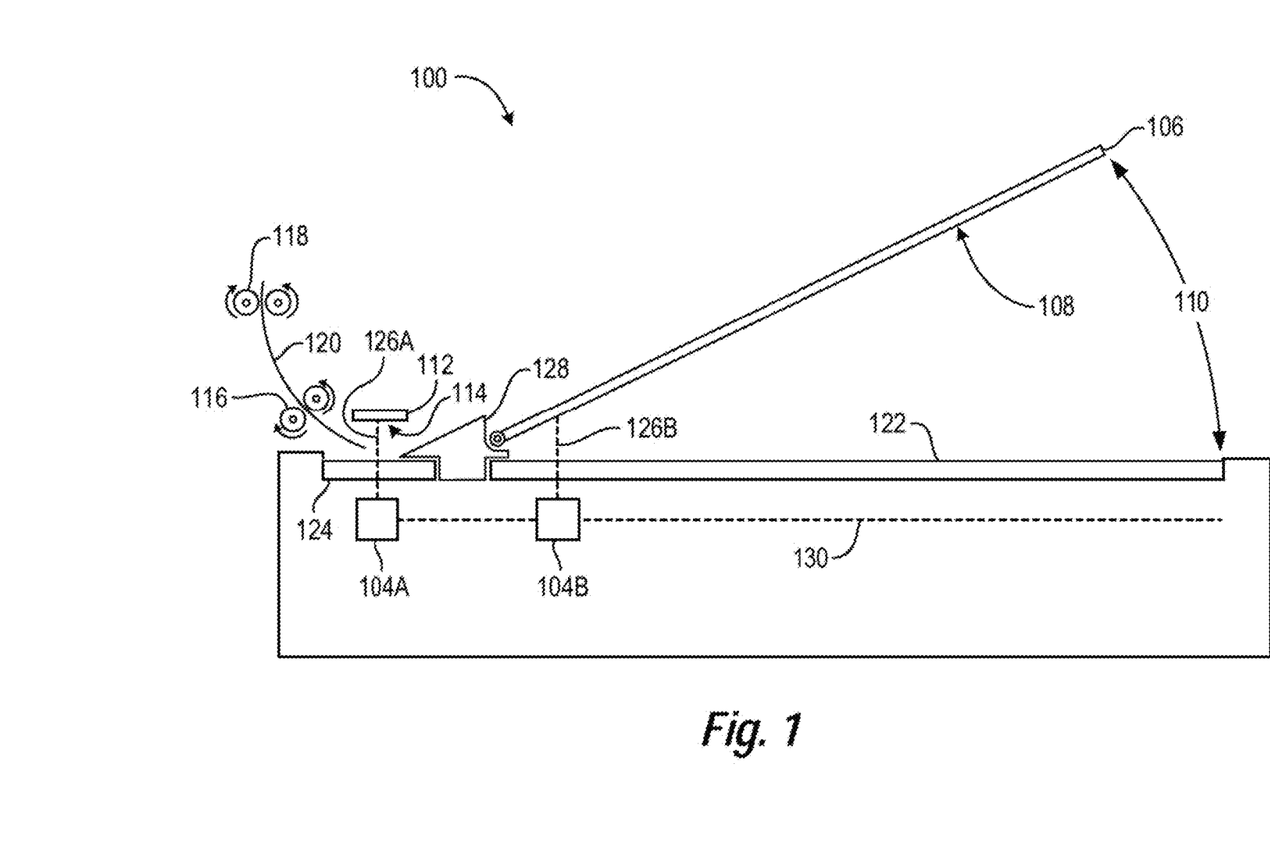
FIG. 1 is a cutaway side view of art example scanner 100.

FIG. 1 is a cutaway side view of an example scanner 100. Scanner 100 is a flatbed scanner with an ADF. Scanner 100 comprises a scan base 102, a movable scan head 104, a transparent platen 122, a lid 106, an ADF ramp 128 and a transparent ADF step glass 124. The scanner base 102 is a generally rectangular box with an open top. The transparent platen 122, the ADF ramp 128 and the ADF step glass 124 are mounted on the open top of the scanner base 102.

The lid 106 is rotatably coupled to the ADF ramp 128 and can be moved between an open position and a closed position (as shown by arrow 110). The lid is shown in the open position. A background 108 is attached to the underside of lid 106. When the lid is in the closed position the background is positioned adjacent to the top surface of the platen 122.

In some examples the scan head may use reduction optics. In other examples the scan head may use a contact image sensor (CIS). The scan head 104 is mounted inside the scanner base and is movable along the length of the scanner base 102 as shown by the dashed line 130. Scan head 104 captures images of objects viewable along optical axis 126 (A&B). The scan head 104 is shown in two locations. Location 104A is an ADP scan location where the scan head would be positioned during an ADF scan.

Location 104B is underneath the platen 122. Dating a flatbed scan the scan head would travel down the length of the platen 122 while capturing an image of objects located on the top surface of the platen 122. Location 104B shows the scan head 104 at one instant of time during a flatbed scan. When the lid is closed during a flatbed scan, the scan head captures an image of the background in areas on the platen not covered by other objects.

Scanner 100 may also comprises a transport system for moving the scan head 104, where the transport system comprises motors, belts, guide rods and the like. Scanner 100 may also comprise one or mote printed circuit (PC) boards for controlling the scanner. The transport system and the PC boards are not shown for clarity.

The ADF comprises a pair of take-up rollers 118, a pair of feed rollers 116 and a background strip 112. The ADF is positioned on top of the scanner over the ADF step glass 124. The ADF may also comprise a case, motors and gears, a controller, an input tray, an output tray and the like, but these items are not shown for clarity. When the scan head is in the ADF scan location, the optical axis 126A intersects with the background strip 112 (i.e. the background strip is viewable by the scan head). A page 120 is shown in the ADF just before it reaches the ADF scan area.

During a scan, the scan head captures an image of the scan area. When an object being scanned is smaller than the scan area, the background of the scanner is captured as part of the image. When the scan is a flatbed scan, the background captured is attached to the underside of the lid 106. When the scan is an ADF scan, the background captured is the background strip 112 positioned above the ADF scan position (104A).

Scanners typically have a scan area larger than the standard document size they are designed for. In this example the scanner is a letter sized scanner. A flatbed letter sized scanner typically has a scan area on the platen slightly larger than a page having, a width of 8.5 inches and a length of 11 inches. For example the scan area may be 8.75 inches wide and 11.25 inches long. The scan area when using the ADF is slightly wider than 8.5 inches and slightly longer than the page being scanned. Therefore when scanning a standard size document, at least some of the background will be included in the scanned image. In other examples the scanner may be a large format scanner. Large format scanners can scan pages that are larger that letter sized pages, for example a page having dimensions of 11×17 inches.

Figure 2:
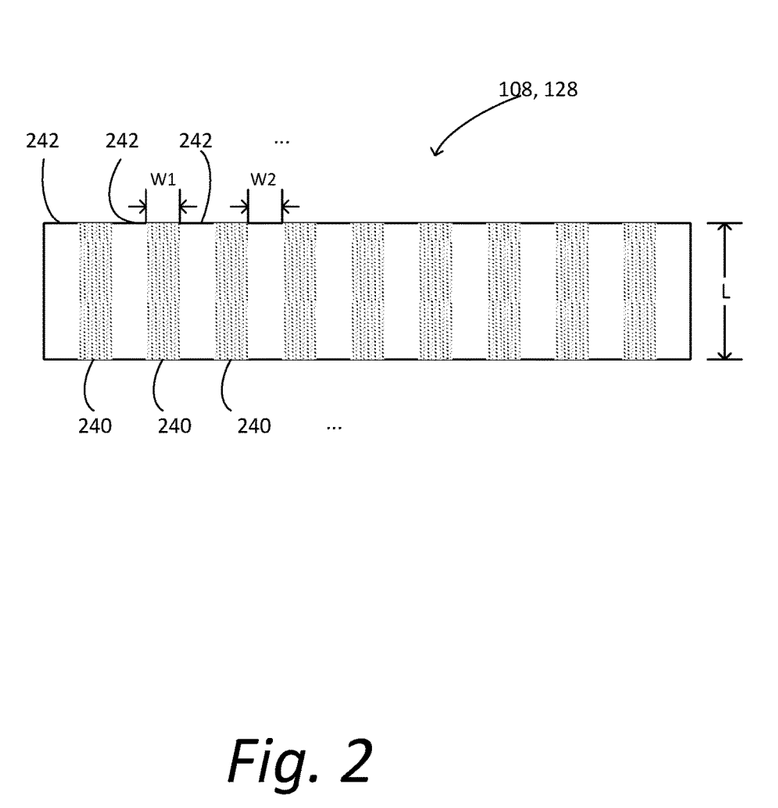
FIG. 2 is an example background pattern (108 and 128).

In one example, the background for the ADF, the flatbed or both will be a repeating pattern of darker tones and lighter tones. FIG. 2 is an example background pattern (108 and 128). The tones in FIG. 2 have been darkened for clarity; in some examples the actual tones in a background will typically be lighter than the tones shown in the figures. The dimensions of the pattern are also not to scale.

Backgrounds 108 and 128 have a repeating pattern of darker tones 240 and lighter tones 242. In this example the repeating pattern forms vertical lines. In other examples the pattern may form diagonal lines or wavy lines. The darker tones 240 have a width W1 and the lighter tones 242 have a width W2. In one example width W1 is equal to width W2. In other examples the widths may not be equal. The widths (W1 and W2) may be dependent on the resolution of the scanner, the modulation transfer function (MTF) of the scanner, or both. The resolution of a scanner is typically given in dots per inch (dpi). A "dot" is also known as a pixel. In one example, for a scanner with a resolution of 300 dpi, widths W1 and W2 are equal to 3 pixels or 0.01 inches (0.245 mm). In other examples widths W1 and W2 may be larger or smaller.

Selecting the width or frequency of the repeating pattern is a trade-off. As the width of the pattern becomes larger the resolution for locating an edge of an object is reduced. As the width of the pattern becomes smaller, the ability of the scanner to detect the pattern is degraded. For example a scanner with 600 dpi resolution may not be able to detect a pattern with a width of 1/1200 dpi.

The length L of the background pattern is different depending on if the background is for an ADF or flatbed scan. When the background is for a flatbed scan the length is equal to the length of the scan platen 122 (see FIG. 1). When the background is for an ADF scan the length is typically between 1 mm and 15 mm, for example 8 mm (See FIG. 2).

In this example the darker tone 240 of the background is light grey. In other examples the darker tone may be a color for example orange. When the darker tone is a color, the darker tone in the background may not be fully saturated. For example the darker tone may be a light orange or light yellow. In other examples the darker tone may be black and the lighter tone may be a dark grey or a dark color, for example a dark blue. In one example the brightness in LAB color space of the lighter tone is equal to $L^*=96$ and the brightness of the darker tone is equal to $L^*=88$. In other examples, one or both of the two tones may be brighter or darker. In one example the tolerance for the brightness of the two tones is $+/-1.5$ $L^*$units. The difference in brightness between the two tones, when measured in LAB color space is equal to delta $(\Delta)L=8$. In other examples $\Delta L^*$ may be larger or smaller.

Both the darker tone and the lighter tone in the background have a constant density or brightness across their full width (i.e. the intensity pattern shown in FIG. 2 is a square wave in the horizontal axis). In other examples the variation between the darker tone and the lighter tone may form other waveforms, for example a sinusoidal or sine wave.

Figure 3A:
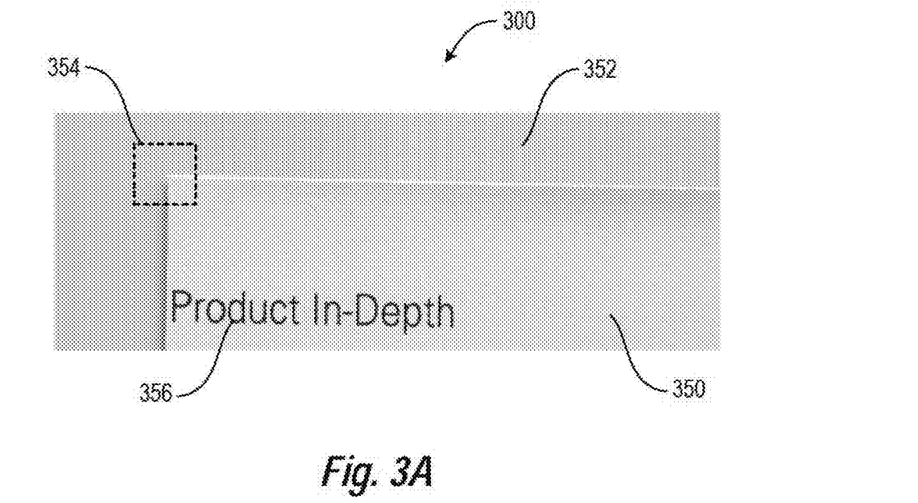
FIG. 3A is a section of an example scanned image 300.
Figure 3B:
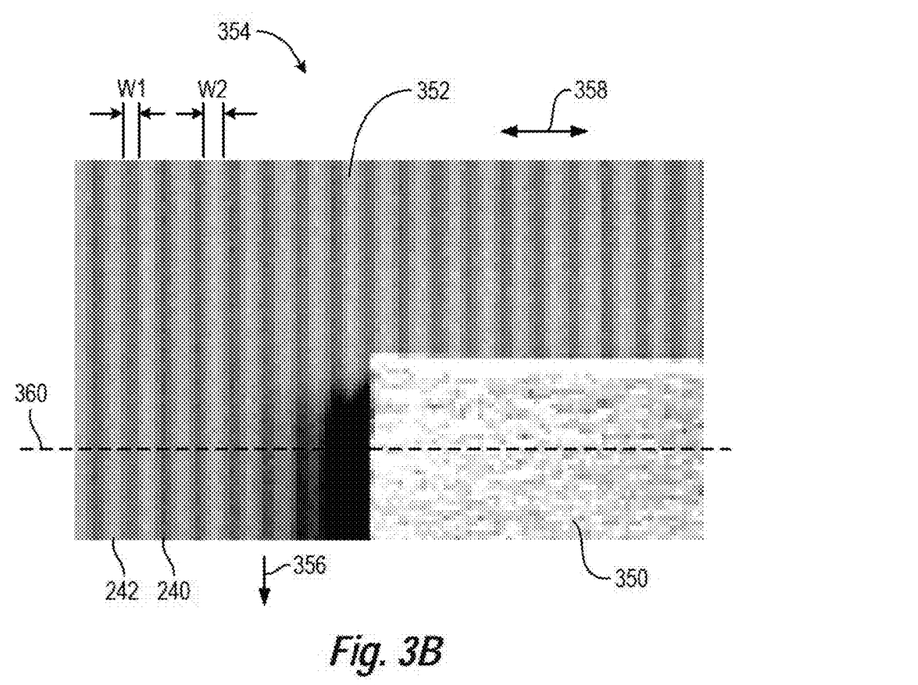
FIG. 3B is an enlargement of area 354 from example image 300.

FIG. 3A is a section of an example scanned image 300. The scanned image 300 has been darkened to increase the clarity. Scanned image 300 comprises an object 350 and a background area 352. The object 350 is a white page with some printed text 356. The background area 352 is an image of a background similar to FIG. 2. FIG. 3B is an enlargement of area 354 from example image 300. FIG. 3B has been darkened to make the areas of interest more visible.

Area 354 comprises the top corner of object 350 (i.e. the top corner of the white page) and the image of the background 352. The image 354 was scanned in a direction shown by arrow 356 (i.e. the scan direction). The scan direction is typically along the length of a page. The axis perpendicular to the scan direction (shown by arrow 358) is typically across the width of a page. A scan line 360 is shown positioned across the background 352 and the object 350. The image in FIG. 3B is shown in black and white. The actual image may have pixels of different colors and shades of grey near white.

The scanned image of the white document (object 350) is not a constant tone or color. The scanned image of the white document is made up of pixels of varying shades or tones near white. The variations may be caused by the texture of the paper fibers, noise in the scanner, variations in the distance between the page and the scanner and the like.

The image of the background 352 has alternating light 240 and white 242 vertical lines. The square wave pattern of intensity values in the background (see FIG. 2) along the axis shown by arrow 358 have been degraded into more of a sinusoidal or sine wave due to the MTF of the scanner. In addition the image of the background has noise in both the scan direction (arrow 356) and across the width of the image (arrow 358). The noise in the image of the background may have different sources dependent on if the scan was an ADF scan or a flatbed scan.

For an ADF scan, the background and scan head are in a fixed position relative to each other, so there is no relative motion between the scan head and the background and during a scan. Therefore when there is a defect on the background, for example dirt, the defect will form a constant intensity vertical streak in the scanned image. Therefore any variations in the image of the background along the scan direction are caused by noise in the scanner.

For a flatbed scan, the scan head travels along the length of the scan platen, so there is relative movement between the scan head and the background (located underneath the lid of the scanner) during a scan. Therefore the noise in the image of the background may be caused by variations in the image of the background, defects on the background, noise in the scanner, variations in the distance between the background and the scanner and the like.

Figure 4:
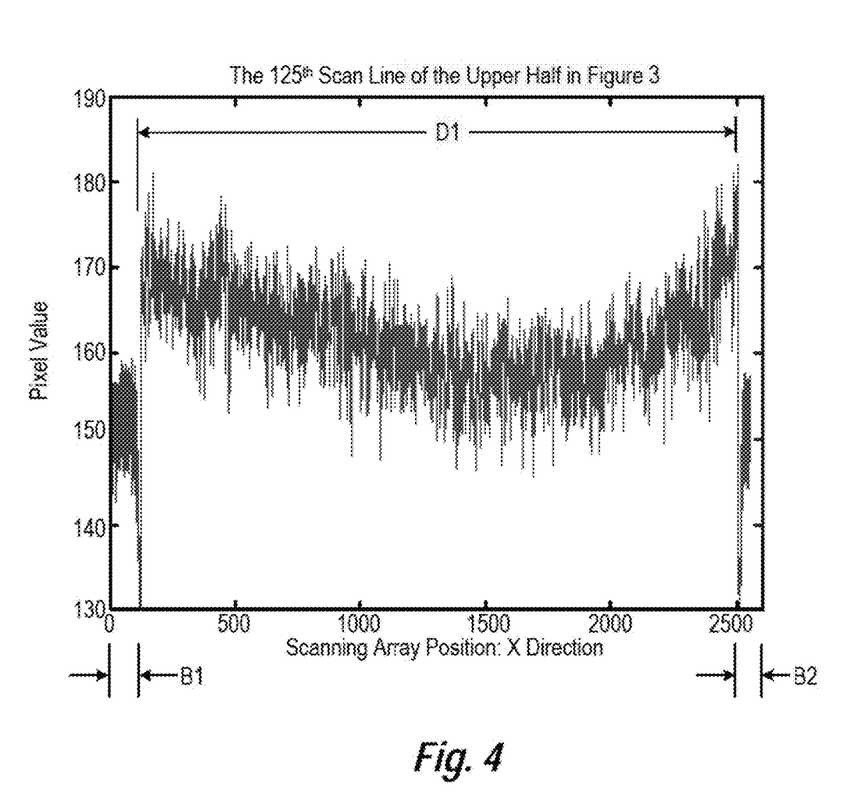
FIG. 4 is an example plot of the intensities of the bill image along scan line 360 (see FIG. 3B).

FIG. 4 is an example plot of the intensities (i.e. the brightness or L*) of the full image along scan line 360 (see FIG. 3B). The vertical axis is the intensity value of a pixel where 255 is white and 0 is black. The horizontal axis is the pixel number where pixel 0 is the left most pixel in the image and 2600 is the right most pixel value. Length D1 are the pixels in the image that correspond to object 350 (i.e. the page). Length B1 and B2 are the pixels m the image that correspond to the background on either side of the object 350 (i.e. the page).

The intensity values of the pixels in the object (area D1) and of the pixels in the background (areas B1 and B2) vary due to noise in the scanned image. The standard deviation of the amplitude of the pixel intensity values in the two background areas (areas B1 and B2 is 4.6. The standard deviation of the amplitude of the pixel intensity values in the object area (D1) is 4.0). This gives a signal to noise ratio between the intensity values of the background and the intensity values of the object of 1.15 to 1.

Because of the low signal to noise ratio, the scanned image will be filtered. The image will be filtered in two directions using two different filters. The image will be filtered in the vertical direction (along the scan direction 356) using a low pass filter and across the width of the image (arrow 358) using a match filter. The filter will reduce the random variation in intensity due to scanner noise and will increase the variation in intensity due to the variation in tone levels in the image of the background area.

In one example the low pass filter may be a running average. When using a running average, the running average may average between 2 and 15 pixels along the scan direction. In one example the match filter may be one cycle of a 6 pixel sinusoid square wave. In this example, the match filter is 6 pixels wide because the period of the light and white bars is 6 pixels. In other examples the match filter may have a different shape or different length. An example filter kernel for a 2 pixel running average and a 6 pixel match filter is shown below:

| 0 | 0.2500 | 0.2500 | 0 | −0.2500 | −0.2500 |
| 0 | 0.2500 | 0.2500 | 0 | −0.2500 | −0.2500 |

Figure 5:
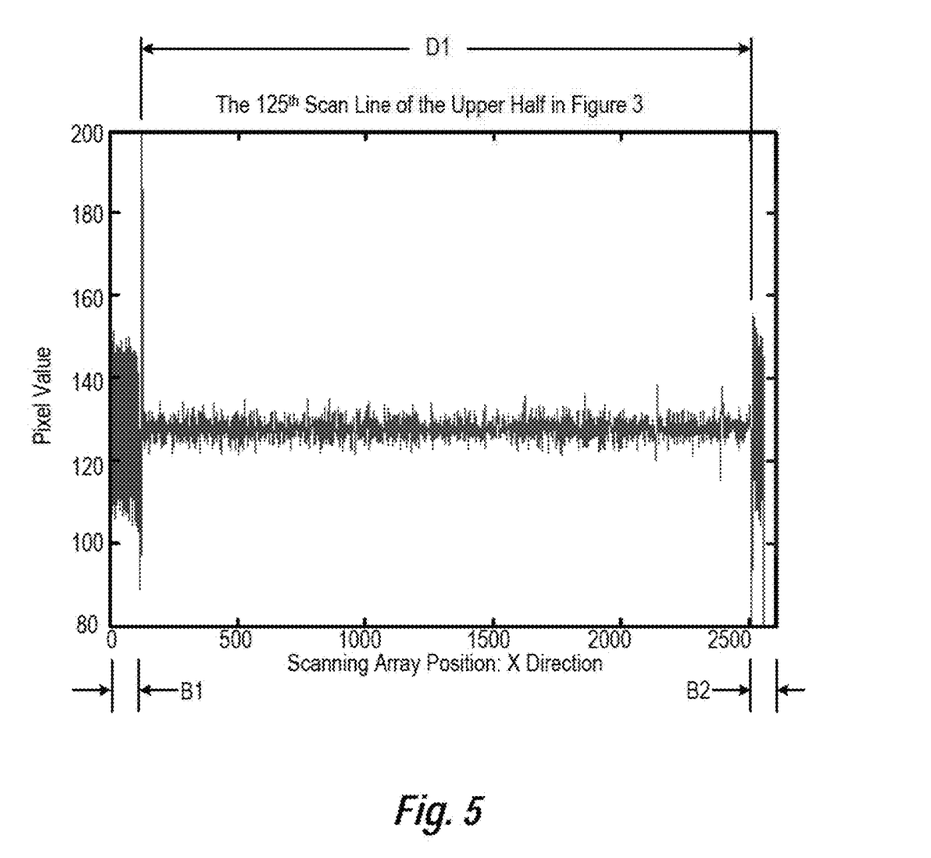
FIG. 5 is an example plot of intensity values of the bill image along scan line 360 (see FIG. 3B) after filtering.

FIG. 5 is an example plot of intensity values of the full image along scan line 360 (see FIG. 3B) after filleting. The vertical axis is the intensity value of a pixel where 255 is white and 0 is black. The horizontal axis is the pixel number where pixel 0 is the loll most pixel in the image and 2600 is the right most pixel value. Length D1 are the pixels in the image that correspond to object 350 (i.e. the page). Length 31 and 32 are the pixels in the image that correspond to the background on either side of the object 350 (i.e. the page). After filtering, the variation of intensity values for the background is higher and the variation in intensity values for the object is lower. The standard deviation of the amplitude of the pixel values in the two background areas is 14.7. The standard deviation of the amplitude of the pixel values in the object areas is 2.21. After filtering, the signal to noise ratio of the variation in pixel values between the background areas and the object is 6.7 to 1.

Figure 6:
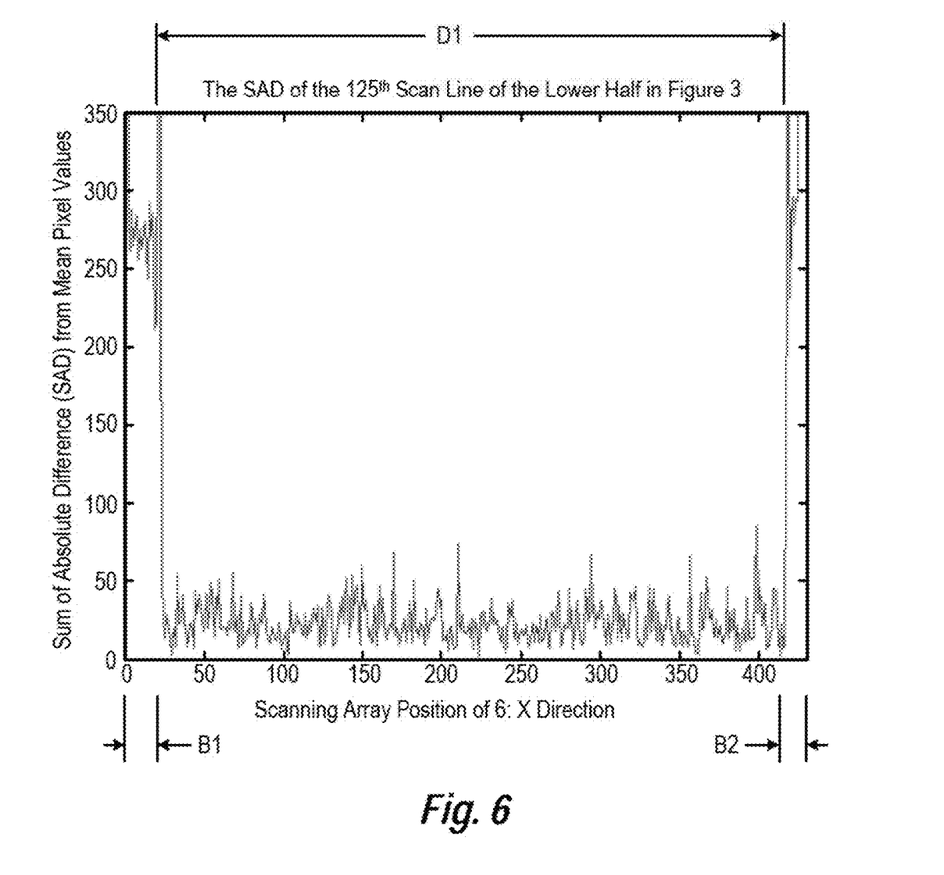
FIG. 6 is an example plot of the SAD values of the full image along scan line 360 (see FIG. 3B).

In one example, the edges of the object are located using the sum of the absolute difference (SAD) from the mean value of a 6 pixel window along the width of the scam FIG. 6 is an example plot of the SAD values of the full image along scan line 360 (see FIG. 3B). The vertical axis is the SAD intensity value of a pixel. The horizontal axis is the pixel number in multiples of 6. Length D2 are the pixels in the image that correspond to object 350 (i.e. the page). Length B1 and B2 are the pixels m the image that correspond to the background on either side of the object 350 (i.e. the page). High variance areas correspond to the background image (i.e. areas B1 and B2). Low variance areas correspond to the uniform areas of the object 350.

The edges of the object in each scan line are the location of the transition between a high intensity variance area and a tow intensity variance area. In some examples the edges of the objects are located for each scan hue in the image. In other examples, the edges of objects are located every Nth scan line where N can equal an integer between 1 and 100 scan lines. Once the edge positions have been located, they can be used for a number of things. For example, the shape and location of the objects can be determined, the orientation or skew of the object can be determined, the number of object in the scanned image can be determined and the like.

Figure 7:
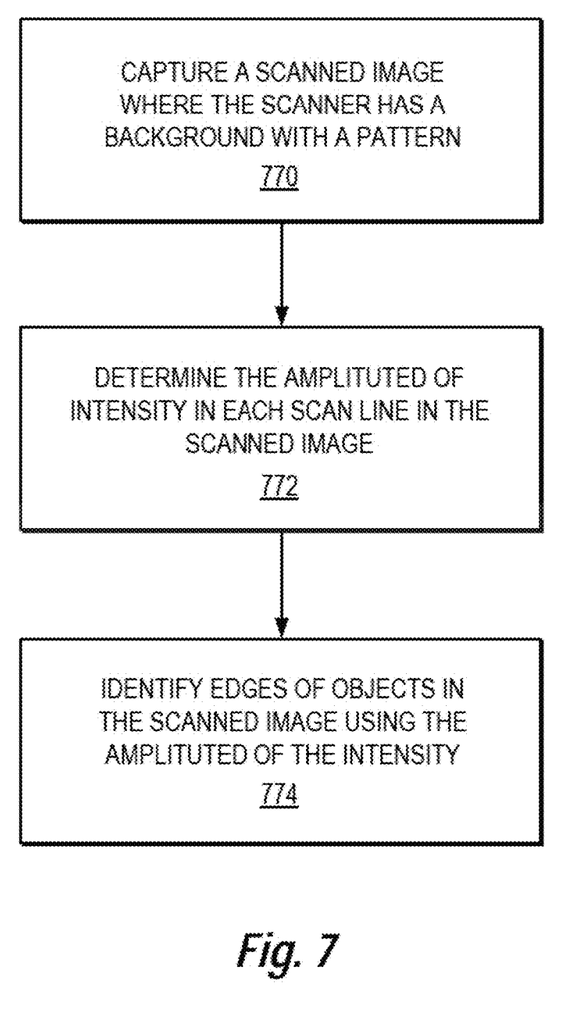
FIG. 7 is an example flow chart for locating edges of objects in a scanned image.

FIG. 7 is an example flow chart for locating edges of objects in a scanned image. Flow starts at 770 where a scanner captures an image, the scanner having a background with a pattern. At 772 the amplitude of the noise in the scanned image is determined for each scan line. At 774 edges of objects in the scanned image are identified as the transition points between areas of high noise variance and low noise variance.

In one example the background pattern scanned in box 770 is a repeating series of alternating darker tones and lighter tones, for example the pattern of FIG. 2. In one example, the amplitude of the noise in the scanned image is determined by filtering the scanned image in box 772. The scanned image is filtered using a low pass filter along a scan direction and a pattern matching, filter along a direction perpendicular to the scan direction.

In one example the scanner firmware will detect the edges of objects in the scanned image. In other examples the image captured by the scanner will be sent to another device, for example a computer attached to the scanner or to a processor inside a multi-functional peripheral (MFP). The edges of the objects in the scanned image will be located by the other device.

Figure 8:
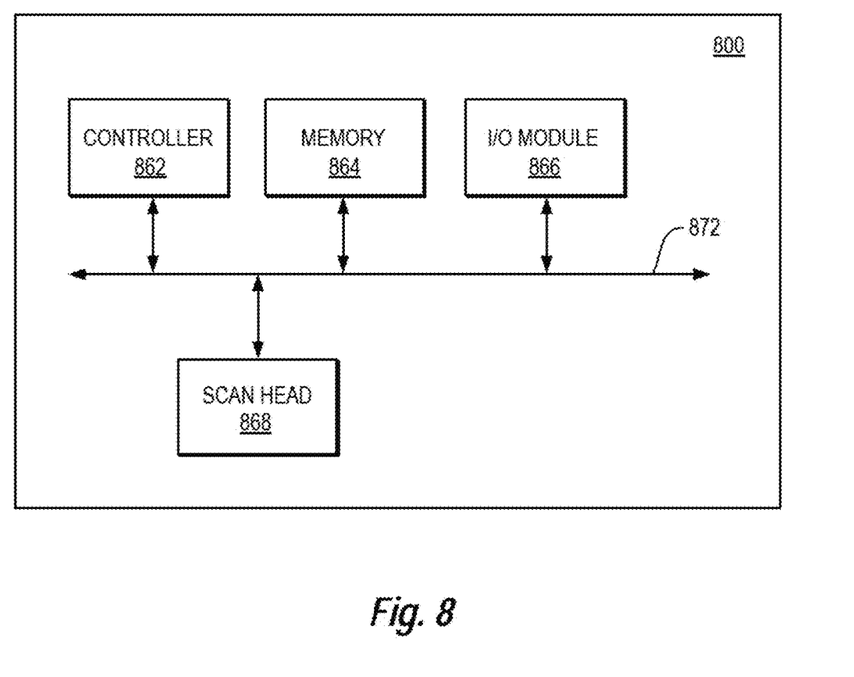
FIG. 8 is an electrical block diagram of an example scanner 800.

FIG. 8 is an electrical block diagram of an example scanner 800. Scanner comprises a controller 862, memory 864, input/output (I/O) module 866 and a scan head 868 all coupled together on bus 872. In some examples scanner may also have a user interface module, an input device, and the like, but these objects are not shown for clarity. Controller 862 comprises at least one processor. The processor may comprise a central processing unit (CPU), a micro-processor, an application specific integrated circuit (ASIC), or a combination of these devices. Memory 864 may comprise volatile memory, non-volatile memory, and a storage device. Memory 864 is as non-transitory computer readable medium. Examples of non-memory include, but are limited to, electrically erasable programmable read only memory (EEPROM) read only memory (ROM). Examples of volatile memory include, but are not limited to, static random access memory (SRAM), and dynamic random access memory (DRAM). Examples of storage devices include, but are not limited to, hard disk drives compact disc drives, digital versatile disc drives, and flash memory devices.

I/O module 866 is used to couple scanner to other devices, for example the Internet or a computer. Scanner has computer executable code, typically called firmware, stored in the memory 864. The firmware is stored as computer readable instructions in the non-transitory computer readable medium (i.e. the memory 864). The process generally retrieves and executes the instructions stored in the non-transitory computer-readable medium to operate the scanner and to execute functions. In one example, processor executes code that locates edges of objects in a scanned image.

Figure 9:
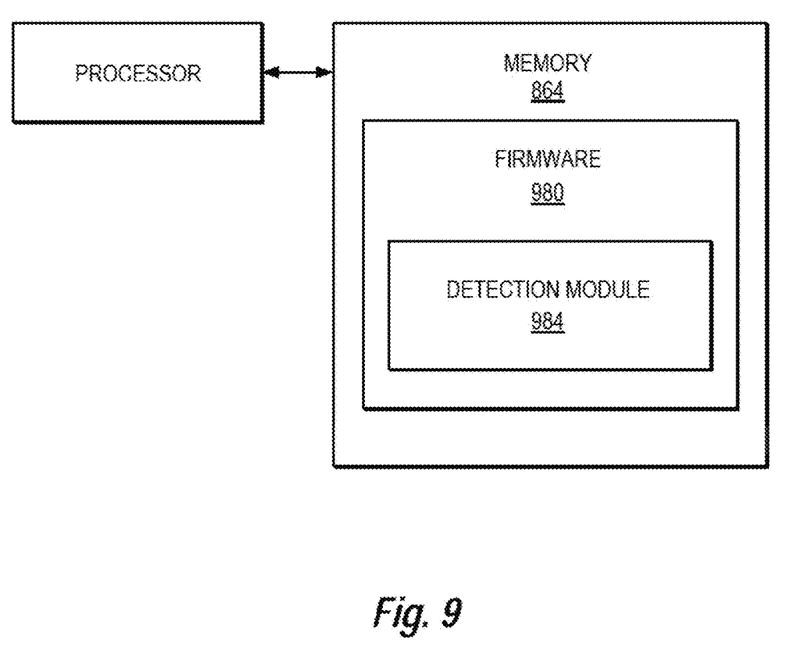
FIG. 9 is an example block diagram of the processor coupled to memory 864.

FIG. 9 is an example block diagram of the processor coupled to memory 864. Memory 864 contains firmware 980. Firmware 980 contains an detection module 984. The processor executes the code in the detection module 984 to locate edges of objects in the scanned image. The detection module may use the method shown in FIG. 7 to locate edges of objects in the scanned image.

What is claimed is:

1. A scanner, comprising:
 a scan head positioned on a first side of a scanning area;
 a background positioned on a second side of the scanning area, opposite the first side, where a front surface of the background is viewable by the scan head;
 the front surface of the background having a pattern thereon;
 the pattern having a repeating series of alternating darker tones and lighter tones;
 a controller coupled to a memory and to the scan head; and
 the controller to scan an image with the scan head, wherein the scanned image is filtered using a low pass filter along a scan direction and a pattern matching filter along a direction perpendicular to the scan direction.

2. The scanner of claim 1, wherein the repeating series of alternating darker tones and lighter tones is perpendicular to a scan direction.

3. The scanner of claim 1, wherein a width of the darker tones and a width of the lighter tones, perpendicular to a scan direction, is dependent on a resolution of the scanner.

4. The scanner of claim 3, wherein the width of the darker tones is equal to the width of the lighter tones.

5. The scanner of claim 1, wherein the scan head is fixed in position during a scan.

6. The scanner of claim 1, wherein the scan head travels along a length of the scan area during a scan.

7. The scanner of claim 1, wherein the darker tone is a light grey.

8. The scanner of claim 1, wherein the darker tone is a color.

9. The scanner of claim 1, further comprising:
 the controller to determine the amplitude of intensity variations in the scanned image for every Nth scan line and to locate edges of objects in the Nth scan line as transition points between areas of high intensity variations and low intensity variations, where N is an integer between 1 and 100.

10. A method of scanning, comprising:
 scanning an image with a scanner having a background pattern, wherein the scanned image is filtered using a low pass filter along a scan direction and a pattern matching filter along a direction perpendicular to the scan direction;
 determining the amplitude of intensity in the image for every Nth scan line;
 identifying edges of objects for the Nth scan line as transition points between areas of high intensity variance and low intensity variance, where N is a positive integer.

11. The method of claim 10, wherein the background pattern is a repeating series of alternating darker tones and lighter tones that are perpendicular to a scan direction.

12. The method of claim 10, wherein a scan head is fixed in position during the scan.

13. The method of claim 10, wherein the transition points between areas of high intensity variance and low intensity variance are located using the sum of the absolute difference (SAD) from the mean value of a pixel window along the width of the scan.

14. A non-transitory computer readable medium containing computer executable instructions, that when executed by a processor, performs the following method, comprising:
 filtering a scanned image using a low pass filter along a scan direction and a pattern matching filter along a direction perpendicular to the scan direction;
 determining the amplitude of intensity for an Nth scan line in the scanned image, the scanned image captured by a scanner having a background with a pattern thereon;
 identifying edges of objects for the Nth scan line as transition points between areas of high intensity variance and low intensity variance, where N is a positive integer.

* * * * *

UNITED STATES PATENT AND TRADEMARK OFFICE
CERTIFICATE OF CORRECTION

PATENT NO. : 10,009,510 B2
APPLICATION NO. : 15/308093
DATED : June 26, 2018
INVENTOR(S) : Di-Yuan Tzeng et al.

It is certified that error appears in the above-identified patent and that said Letters Patent is hereby corrected as shown below:

In the Drawings

In sheet 7 of 9, FIG. 7, reference numeral 772, Line 1, delete "AMPLITUTED" and insert -- AMPLITUDE --, therefor.

In sheet 7 of 9, FIG. 7, reference numeral 774, Line 3, delete "AMPLITUTED" and insert -- AMPLITUDE --, therefor.

Signed and Sealed this
Twenty-sixth Day of November, 2019

Andrei Iancu
*Director of the United States Patent and Trademark Office*